Dec. 27, 1932.  H. A. VORTHMANN  1,892,495
COMBINATION TRACTOR AND ELEVATOR UNIT
Filed Dec. 24, 1931    3 Sheets-Sheet 1
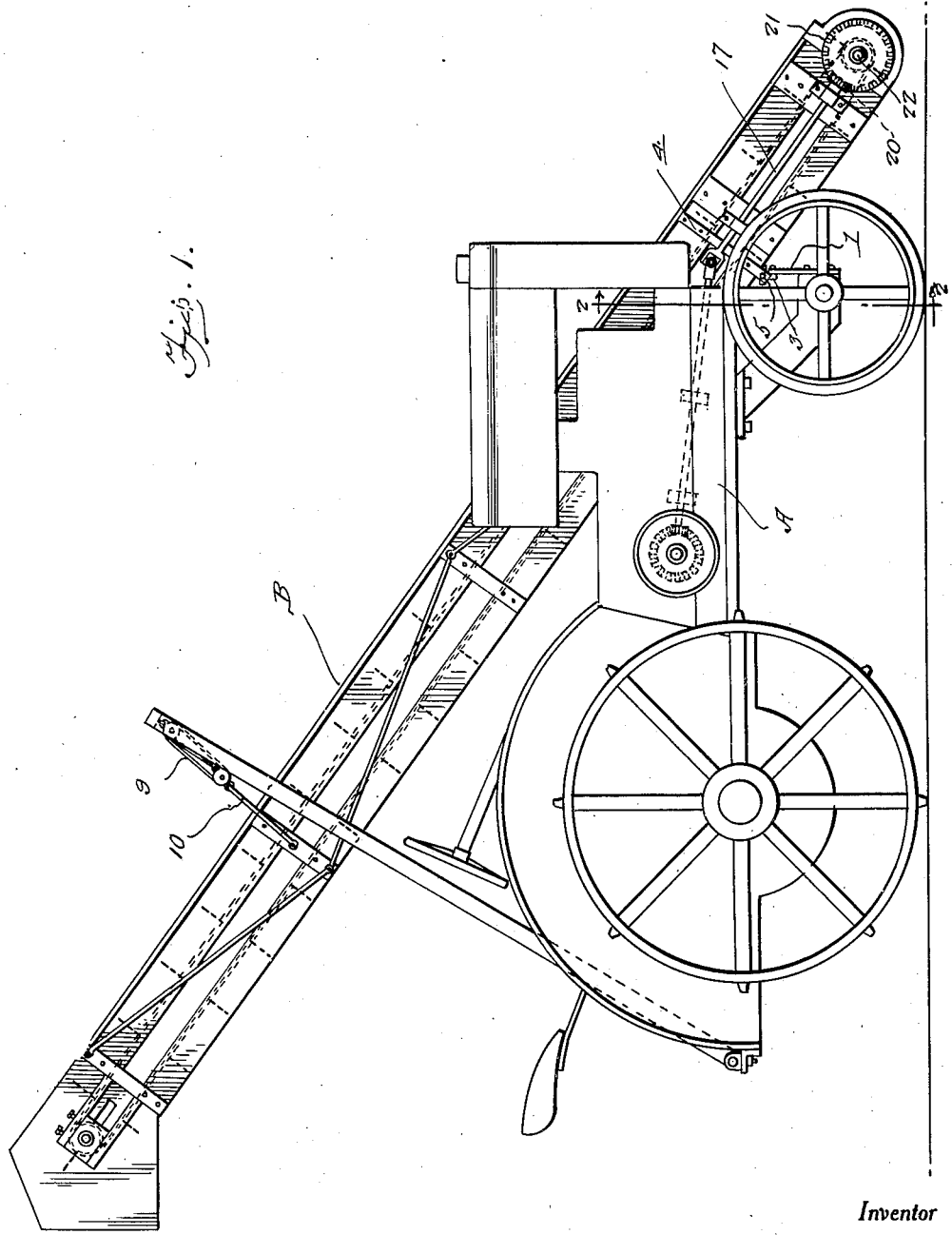
Inventor
*H. A. Vorthmann*
By *Clarence A. O'Brien*
Attorney Dec. 27, 1932.   H. A. VORTHMANN   1,892,495
COMBINATION TRACTOR AND ELEVATOR UNIT
Filed Dec. 24, 1931   3 Sheets-Sheet 2
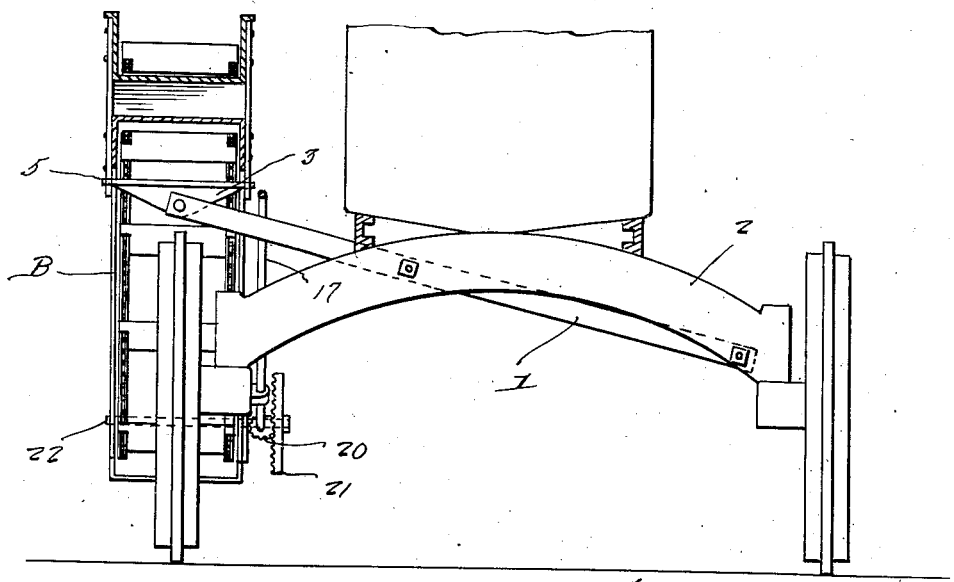
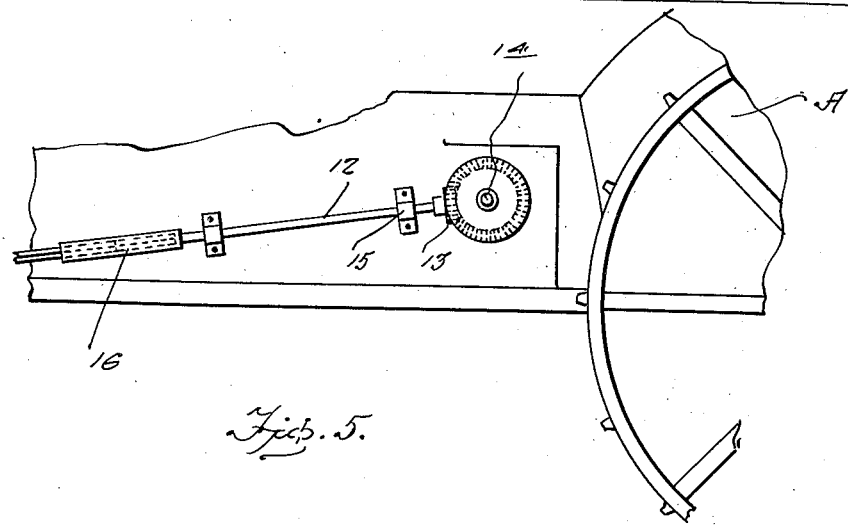
Inventor
H. A. Vorthmann
By Clarence A. O'Brien
Attorney Dec. 27, 1932.    H. A. VORTHMANN    1,892,495
COMBINATION TRACTOR AND ELEVATOR UNIT
Filed Dec. 24, 1931    3 Sheets-Sheet 3
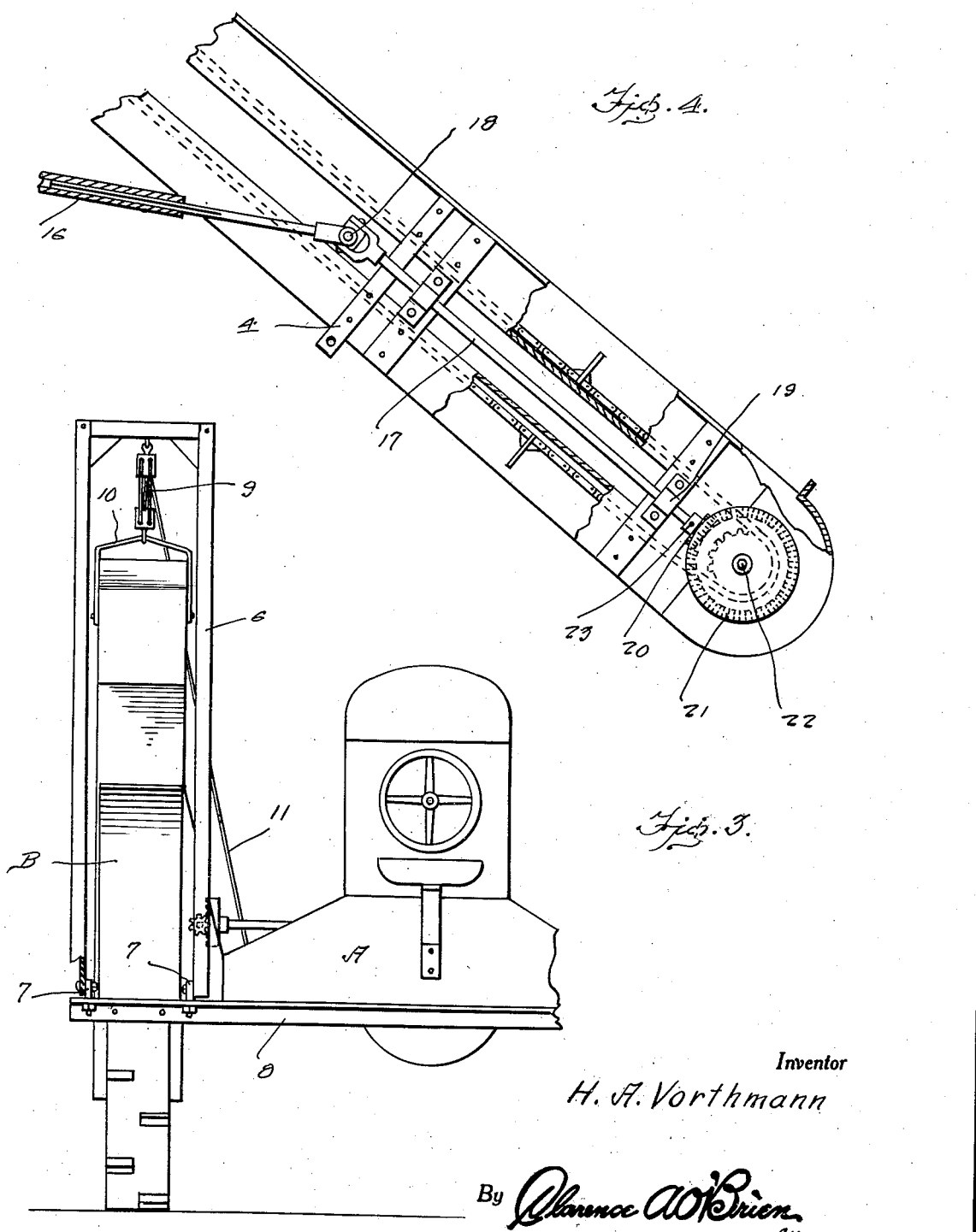
Inventor
H. A. Vorthmann
By Clarence A. O'Brien
Attorney Patented Dec. 27, 1932

1,892,495

UNITED STATES PATENT OFFICE

HERBERT A. VORTHMANN, OF COUNCIL BLUFFS, IOWA

COMBINATION TRACTOR AND ELEVATOR UNIT

Application filed December 24, 1931. Serial No. 583,113.

This invention relates to a combination tractor and elevator unit, the general object of the invention being to provide means for adjustably connecting an elevator with a tractor so that the elevator can be transported from place to place by the tractor and can be raised and lowered to remove ears of corn, grain, etc., or to load material from one container into another.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of the invention.

Fig. 2 is a section on line 2—2 of Figure 1.

Fig. 3 is a fragmentary rear view.

Fig. 4 is a fragmentary view with parts in elevation and parts in section showing the means for operating the elevator from the tractor.

Fig. 5 is a fragmentary view thereof showing the power take-off means.

In these drawings, the tractor is shown at A and the elevator at B and in carrying out my invention, I attach a diagonally arranged bar 1 to the front axle 2 of the tractor with the outer end of the bar located above one of the wheels of the tractor and a substantially triangular-shaped plate 3 is pivoted to the outer end of this bar.

A strip 4 is fastened to each side of the elevator B an appreciable distance from the lower or front end thereof and these strips extend below the elevator and have holes therein for receiving trunnions 5 on the plate 3, so that the elevator is pivotally supported by the plate.

An elongated frame 6 has the lower ends of its side members pivoted to the brackets 7, fastened to one side of the platform 8 of the tractor, and the upper end of the frame supports a block and tackle, shown generally at 9, which is attached to a yoke 10 connected with the elevator so that by manipulating the cable 11, the elevator can be raised and lowered. By pivoting the frame 6 to the tractor platform, when the elevator is raised, the frame 6 will straighten automatically, and when the elevator is lowered, the frame will move down over the tractor wheel and fender and will permit storing of the elevator in a low shed.

A shaft 12 is connected by the gears 13 to the take-off shaft 14 of the tractor and said shaft is journalled in the brackets 15 attached to a side of the tractor. The shaft 12 is formed of two sections which are telescopically connected together as shown at 16 and the outer section is connected to a shaft 17 by universal joints 18, the shaft 17 being journalled in the bracket 19 attached to a side of the elevator, and said shaft 17 is connected by the pinion 20 and gear 21 to the power shaft 22 of the elevator.

The pin 23 of wood or the like connects the pinion with the shaft 16 so that said pin will break if the conveyor of the elevator is subjected to great strain for any reason, and that prevents damage to the parts.

From the foregoing it will be seen that I have provided simple means for adjustably connecting an elevator to a tractor, so that the elevator can be readily transported from place to place and used for transferring material from one receptacle to another such as the unloading of materials from the wagon, and from a bin into a wagon.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

In combination with a tractor, a bar rigidly connected to the front axle thereof and having one end located above one of the front wheels, a vertically arranged plate having its center pivotally connected with said end of the bar and having trunnions at its ends arranged in a horizontal plane at right angles to the axis of the tractor, an elevator having depending members at its sides adjacent the front thereof provided with holes for receiving the trunnions, a frame pivoted to a rear part of the tractor and straddling a fender, the rear part of the elevator passing through said frame, a pulley at the upper end of the frame, a cable passing over the pulley and connected with a part of the elevator for raising and lowering the elevator.

In testimony whereof I affix my signature.

HERBERT A. VORTHMANN.